United States Patent
Walchli et al.

[11] Patent Number: 5,962,791
[45] Date of Patent: Oct. 5, 1999

[54] PIRANI+CAPACITIVE SENSOR

[75] Inventors: Urs Walchli, Heiligkreuz, Switzerland; Per Bjorkman, Palsbole, Finland

[73] Assignee: Balzers Aktiengellschaft, Furstentum, Liechtenstein

[21] Appl. No.: 09/116,666

[22] Filed: Jul. 16, 1998

[51] Int. Cl.$^6$ .................................................. G01L 21/12
[52] U.S. Cl. .............................................. 73/755; 73/724
[58] Field of Search ........................... 73/755, 724, 718; 361/283.4

[56] References Cited

U.S. PATENT DOCUMENTS 4,154,115  5/1979  Hartung et al. ............................ 73/718

Primary Examiner—Joseph L. Felber
Attorney, Agent, or Firm—Notaro & Michalds P.C.

[57] ABSTRACT

In order to cover a large measuring range extending from about $10^{-6}$ mbar to about 10 bar, a simple, compact and economically producible pressure sensor (3) arranged in a protective tube (1) has, on a support plate (5), a ceramic membrane (6) which, together with the support plate (5), forms a capacitive measuring element for the determination of pressures between about 0.1 mbar and 10 bar, and two measuring wires (11, 12) which are arranged adjacent to the membrane (6) and constitute a Pirani measuring element with substantial compensation of the effect of the wall temperature, for the determination of pressures between about $10^{-6}$ mbar and 1 mbar. The membrane (6) is shielded from the radiation of the measuring wires (11, 12) by a protective ring (16).

11 Claims, 1 Drawing Sheet

PIRANI+CAPACITIVE SENSOR

FIELD OF THE INVENTION

The invention relates to a pressure sensor and a pressure measuring apparatus which comprises a pressure sensor.

BACKGROUND OF THE INVENTION

Known pressure sensors of the generic type contain only a capacitive measuring element consisting of a support plate and a membrane, which carry electrically conductive layers. Although measurement can be carried out independently of the type of gas and with high accuracy between about $10^{-6}$ mbar and 10 bar by means of such measuring elements, the total range cannot be measured with a single measuring element.

The use of pressure sensors which are in the form of heat conduction manometers, for example according to Pirani, is also known. In such pressure sensors, at least one measuring wire is electrically heated and the pressure is determined from the heating power, making use of the pressure-dependent thermal conductivity of the gas. In this way, it is possible to measure the pressure in a range between about $10^{-3}$ mbar and a few 100 mbar. Above a few 10 mbar, however, convective heat transmission predominates, so that the measurement is influenced there by gas flows and is highly position-dependent. Moreover, the measurement by this method is always dependent on the type of gas. A Pirani pressure sensor, including its evaluation electronics, can also be designed in such a way that it can be operated up to about $10^{-5}$ or max. $10^{-6}$ mbar, but in this case higher pressures above a few mbar can no longer be reliably measured.

It is also known that so-called ionization vacuum sensors whose function is based on the measurement of the particle current density after striking of a gas discharge can be used for pressures below $10^{-2}$ mbar and, with further reduced accuracy, up to $10^{-1}$ mbar. A distinction is made between cold-cathode ionization vacuum gages and those having a hot cathode. They are not capable of functioning in higher pressure ranges and are inaccurate from about $10^{-2}$ mbar. They are in principle dependent on the type of gas.

If it is intended to measure large pressure ranges, for example from about $10^{-6}$ mbar to about 100 mbar, it is usual to use at least two different, spatially separated pressure sensors which, independently of one another, are each also provided with devices for processing the measured signal. Thus, for example, it is possible to use two or more pressure sensors which each contain a capacitive measuring element of the type described at the outset which is suitable for measuring a part of the range. These and similar solutions are, however, more expensive owing to the associated technical complexities.

However, the combination of different pressure sensors in one apparatus is also known. Thus, EP-A-0 658 755 discloses a pressure measuring apparatus in which a Pirani element and a cold-cathode element are combined to give a pressure measuring apparatus, the former measuring an upper pressure range and the latter a lower one. Although the apparatus is compact and can measure the total above-mentioned range, it has the above-mentioned disadvantages of the stated elements in terms of measuring technology.

The combination of a bellows-type mechanical pressure measuring element with a Pirani-like pressure measuring element is also known (U.S. Pat. No. 3,064,478). Here, the corresponding pressure measuring apparatus is relatively inconvenient. Moreover, uncertainities in the measured result may arise from the spatial separation of the measuring elements.

SUMMARY OF THE INVENTION

It is the object of the invention to provide a pressure sensor which covers a large measuring range—preferably from about $10^{-6}$ mbar to a few bar—and at the same time has a simple design and is compact and economical, and a pressure measuring apparatus which is distinguished by the same characteristics and which can be mounted easily, in any position and quickly.

The pressure sensor according to the invention combines a capacitive membrane pressure measuring element with a Pirani element in compact, easily handled and economically producible form. The upper pressure range above about 0.1 mbar is covered by the membrane element independent of the type of gas, and the lower pressure range from about $10^{-6}$ mbar to about 1 mbar by the Pirani element. Consequently, pressures between about 1 mbar and a few bar can be measured independently of the type of gas and with high accuracy (in general about 1%), while at the same time the measuring range extends down to about $10^{-6}$ mbar with generally sufficient accuracy of measurement. The proximity of the two measuring elements ensures that they are always exposed to the same conditions. The pressure sensor is versatile and may also be formed in such a way that it is suitable for relative pressure measurements in the first-mentioned part of the measuring range. The arrangement is small and compact, for example having a diameter of 35 mm or less. Regarding the Pirani measurement, optimal operating behavior can be realized in said pressure range with a heating element of small size, for example a short heating filament.

BRIEF DESCRIPTION OF THE DRAWINGS

The invention is explained in more detail below with reference to drawings which illustrate only one embodiment.

DETAILED DESCRIPTION OF THE INVENTION

Figure 1:
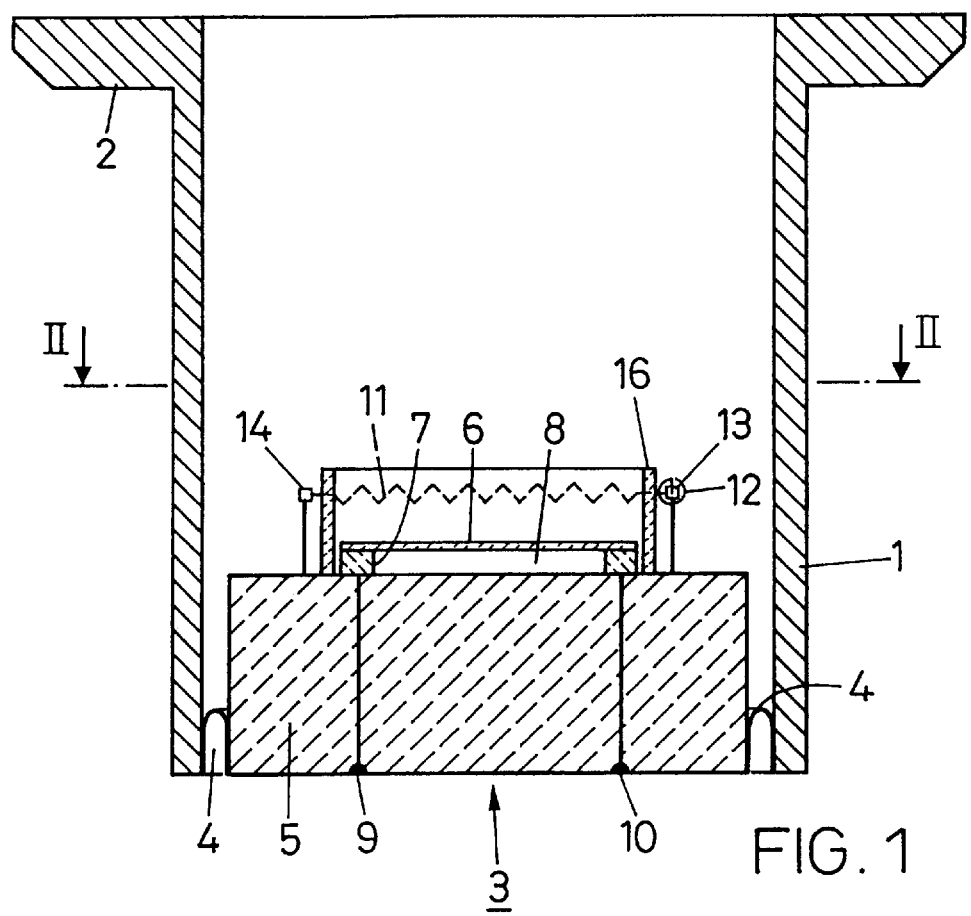
FIG. 1 shows an axial longitudinal section through a pressure measuring apparatus according to the invention and FIG. 2 shows a cross-section along II—II in FIG. 1.
Figure 2:
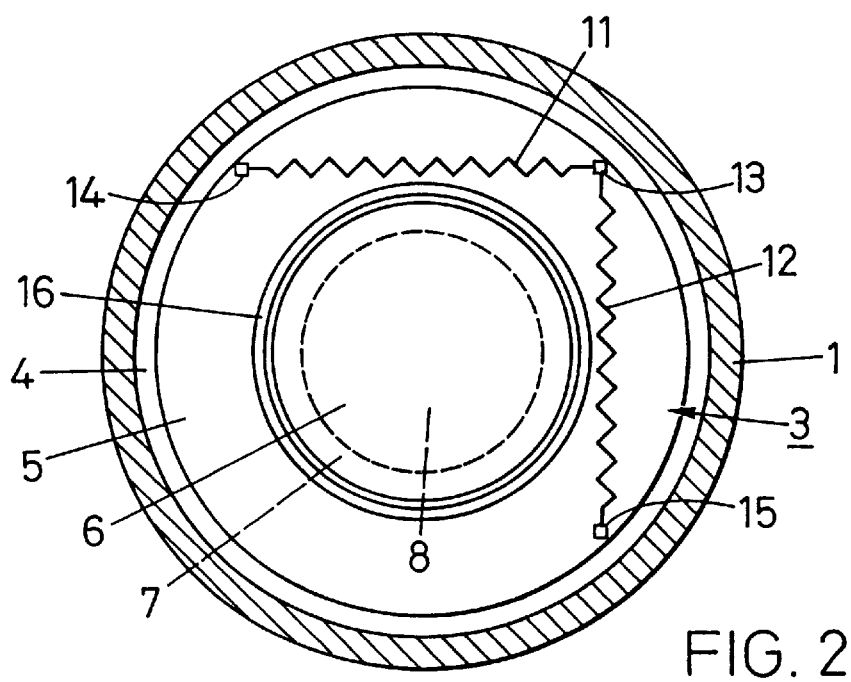

A pressure sensor 3 is suspended elastically and gas-tight, by means of an annular elastic spring 4, at the end of a protective tube 1 having a flange 2, by means of which the protective tube 1 can be connected to a corresponding connection of a vacuum chamber. The spring 4 is hard-soldered to a support plate 5 of the pressure sensor 3 and welded to the protective tube 1. It compensates for the different thermal expansions of the protective tube 1 produced from steel and of the support plate 5 which preferably consists of a ceramic containing at least 95% of $Al_2O_3$.

Mounted on the inner surface of the support plate 5, which surface faces toward the interior of the protective tube 1, is a membrane 6 which is connected gas-tight by an all-round glass seal 7 to the support plate 5 and at the same time is a distance away from said support plate, so that it, together with the latter, encloses a reference vacuum 8 which may be gettered. The membrane 6 is preferably produced from a ceramic which preferably contains $Al_2O_3$ or predominantly comprises the latter. Its thickness is preferably between 10 μm and 1000 μm, in particular between 10 μm and 250 μm. Those surfaces of the support plate 5 and of the membrane 6 which are opposite one another each carry an electrically conducting layer, which layers are connected through the support plate 5 to connections 9, 10 on the outside of said support plate. They form a capacitance whose magnitude is monitored in a known manner by means of a suitable evaluation circuit which derives a pressure signal from it. In the preferred embodiment of the support plate 5 and of the membrane 6 of ceramic, the measuring element formed therefrom is also resistant in a corrosive atmosphere.

In addition, two heating elements arranged adjacent to the membrane 6 are provided. They are in the form of measuring wires 11, 12 which diverge approximately at right angles toward holders 14, 15 at a slightly larger distance than the membrane 6, parallel to the inner surface of the support plate 5, starting from a middle holder 13. They are preferably produced from nickel, platinum or tungsten or an alloy containing at least one of these metals, so that they themselves are corrosion-resistant with respect to corrosive gases. The holders are connected through the support plate 5 to connections (not shown). The membrane 6 is surrounded by a protective ring 16, for example of ceramic, which protects it from the light and heat radiation emitted by the measuring wires 11 and 12 and prevents said membrane from being heated by said radiation and possibly its sag being influenced.

In an upper part of the measuring range, from about 0.1 mbar to about 10 bar, the gas pressure is determined from the capacitance of the capacitor which is formed by the electrically conducting layers on the support plate 5 and the membrane 6, which layers are separated by the reference vacuum 8. This capacitance depends on the sag of the membrane 6, which in turn is a function of the gas pressure. Below the lower limit of the range, the effect of the gas pressure on the sag of the membrane 6 is so small that changes therein are no longer detectable with sufficient accuracy. In the lower part of the measuring range, from about $10^{-6}$ mbar to about 1 mbar, the measurement is therefore carried out according to the Pirani principle.

The transition between capacitive and Pirani method may occur abruptly, which may however easily lead to jumps in the measured value and hysteresis effects. It preferably takes place steadily in an overlap interval, between 0.1 mbar and 1 mbar, in particular according to the method described in EP-A-658 755.

For measurement according to the Pirani principle, the two measuring wires 11, 12 are heated by electric currents to different temperatures $T_1$, $T_2$. Using the formula known, for example, from H. R. Hidber, G. Süss: "Pirani manometer with linearized response", Rev. Sci. Instrum. 47/8 (1976), 912–914, for the power output by heat transfer from the measuring wire to the vessel wall as a function of the gas pressure p in the vessel, the temperature T of the measuring wire and the wall temperature $T_W$ $$N(p)=\alpha(\epsilon T^4-\epsilon_W T_W^4)+\beta(T-T_W)/\sqrt{T_W}\times p+\gamma(T-T_W) \quad (1)$$

the pressure is then determined from the measured powers.

In (1), the first term relates to the heat transfer by radiation and the last term relates to that by thermal conduction in the region of the connections of the measuring wire, while the middle term describes, for a range of pressures below 1 mbar which is of particular interest here, the heat transfer caused by the pressure-dependent thermal conduction by the gas. When a somewhat more complicated formula which also takes into account the saturation at higher pressures is used for the dependence of this term on the pressure, this method can also be applied to a substantially larger pressure range without substantial changes.

If N(p) is measured at the two different measuring wire temperatures $T_1$ and $T_2$ at which the measuring wires 11, 12 have stabilized, and the difference is calculated, the result is $$N_1(p)-N_2(p)=\alpha\epsilon(T_1^4-T_2^4)+\beta(T_1-T_2)/\sqrt{T_W}\times p+\gamma(T_1-T_2) \quad (2)$$

$\alpha$, $\epsilon$, $\beta$ and $\gamma$ are constants. $T_1$ and $T_2$ correspond to uniquely determined resistance values of the measuring wire, which are each preferably likewise adjusted to specific values during the measurement and are kept constant. The equation may thus be summarized as $$N_1-N_2=A+B\times p/\sqrt{T_W} \quad (3)$$

with constants A, B. The wall temperature is included only in the square root $\sqrt{T_W}$, whereas the terms in (1) which are highly dependent on the wall temperature and contain higher powers thereof are absent in (3).

If a standardized pressure P already containing the so-called thermal transpiration (cf. in this context K. F. Poulter et al., Vacuum 33 (1983), 311 and W. Jitschin et al., J. Vac. Sci. Technol. A5 (1987), 372) is defined as $$P=\sqrt{(T_{W0}/T_W)}\times p, \quad (4)$$

which, for example at $T_{W0}=300°$ K., corresponds to the pressure p, said standardized pressure is obtained as $$P=(N_1-N_2-A)/C \quad (5)$$

where C is also a constant. P is thus independent of the wall temperature.

Various modifications of the embodiment described are of course possible. Thus, for example, the boundary between the lower and the upper range can be changed—in particular depending on the properties of the membrane. The Pirani pressure measurement can also be carried out with only one heating wire which can be brought alternately to the different temperatures $T_1$, $T_2$ or may also operate only at one temperature. In the latter case, however, greater effects of the wall temperature must be taken into account. Depending on the field of use, materials other than the stated ones can also be used in some cases or, instead of a measuring wire, another resistance heating element, for example a tape, a thin-film arrangement, a microchip or a Pirani element produced by microtechnology on an Si wafer, may also be used.

Finally, the pressure sensor may also be formed in such a way that it is suitable for relative measurements in the upper part of the measuring range, by providing a hole through the support plate, which hole opens into the volume lying between said support plate and the membrane which in this case is not in the form of a reference vacuum.

We claim:

1. A pressure sensor having a support plate (5) which is preceded at a distance by a membrane (6) connected gas-tight to it, the support plate (5) and the membrane (6) being provided with electrically conducting layers so that they form a capacitive sensor, wherein, in addition to the membrane (6), said pressure sensor has a heat conduction measuring arrangement with at least one heating element which is supported on the support plate (5).

2. The pressure sensor as claimed in claim 1, wherein the membrane (6) consists of a ceramic which contains in particular $Al_2O_3$, and its thickness is between 10 µm and 1000 µm.

3. The pressure sensor as claimed in claim 1, wherein the connections to at least one heating element are led through the support plate (5) and each heating element is in the form of a heating wire (11, 12), a tape, a thin-film arrangement or a microchip.

4. The pressure sensor as claimed in claim 1, which has at least two heating elements heatable independently of one another.

5. The pressure sensor as claimed in claim 1, wherein the at least one heating element contains nickel, platinum or tungsten.

6. The pressure sensor as claimed in claim 1, wherein the at least one heating element is arranged at a larger distance from the support plate (5) than the membrane (6) beside the latter.

7. The pressure sensor as claimed in claim 1, wherein the membrane (6) is shielded from radiation emitted by the at least one heating element.

8. The pressure sensor as claimed in claim 7, wherein the shielding of the membrane (6) is ensured by a protective ring (16) which surrounds said membrane and is arranged on the support plate (5) and outside which the at least one heating element is arranged.

9. The pressure sensor as claimed in claim 1, wherein a gettered reference vacuum (8) is enclosed between the support plate (5) and the membrane (6).

10. A pressure measuring apparatus having a pressure sensor (3) as claimed in claim 1, wherein said apparatus comprises a protective tube (1) which is provided with at least one flange (2) and in which the support plate (5) is suspended in an elastic and sealing manner.

11. The pressure sensor according to claim 2, wherein the membrane thickness is between 10 $\mu$m and 250 $\mu$m.

* * * * *